Sept. 7, 1954      J. H. STARR      2,688,282
TRACTOR DRAWN PLOW
Filed Oct. 25, 1948      3 Sheets-Sheet 3
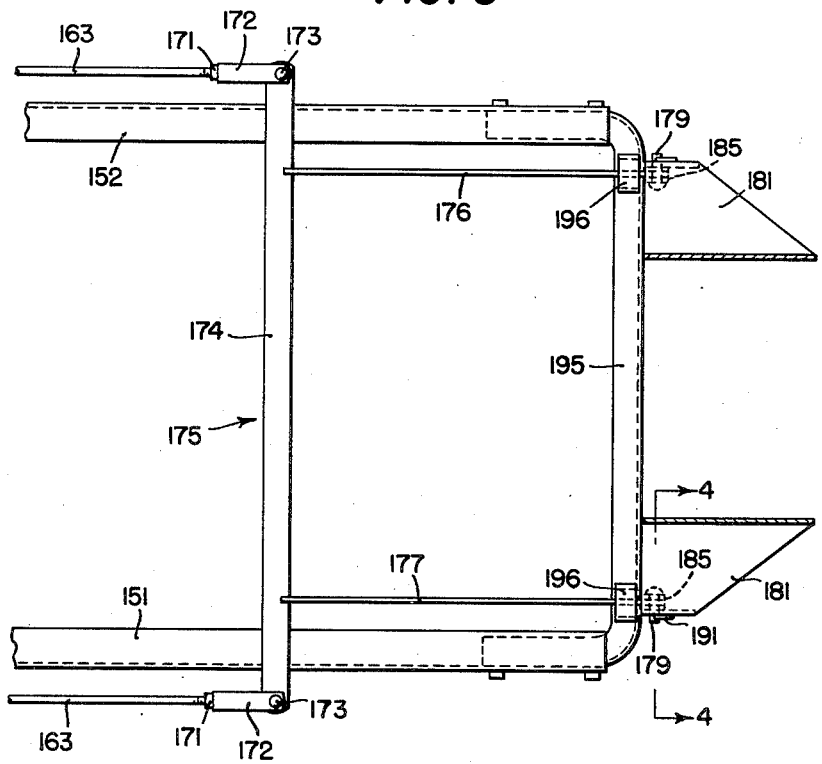
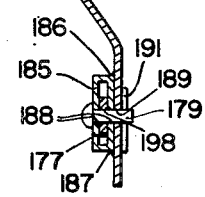
INVENTOR.
JOHN H. STARR
BY
ATTORNEYS Patented Sept. 7, 1954

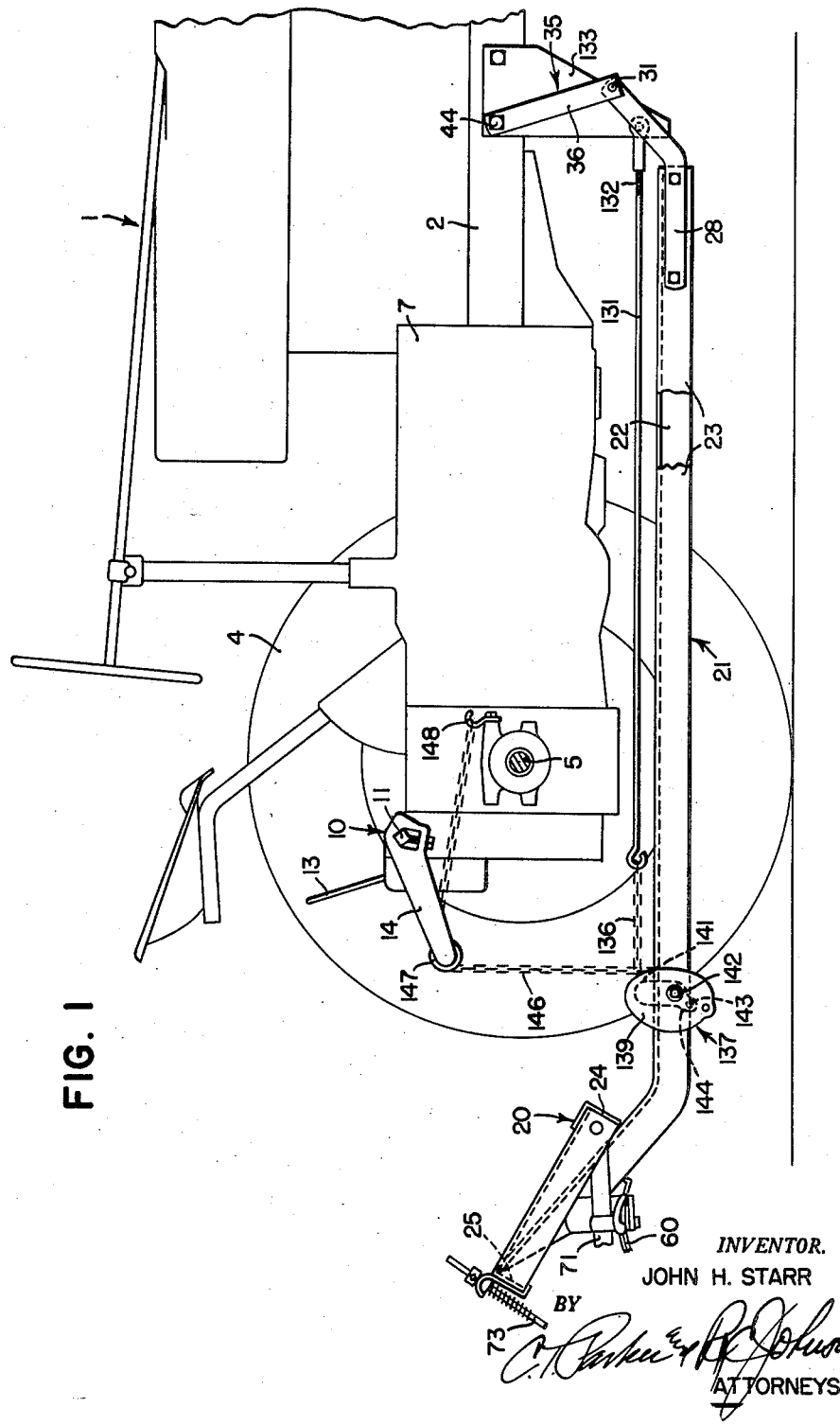

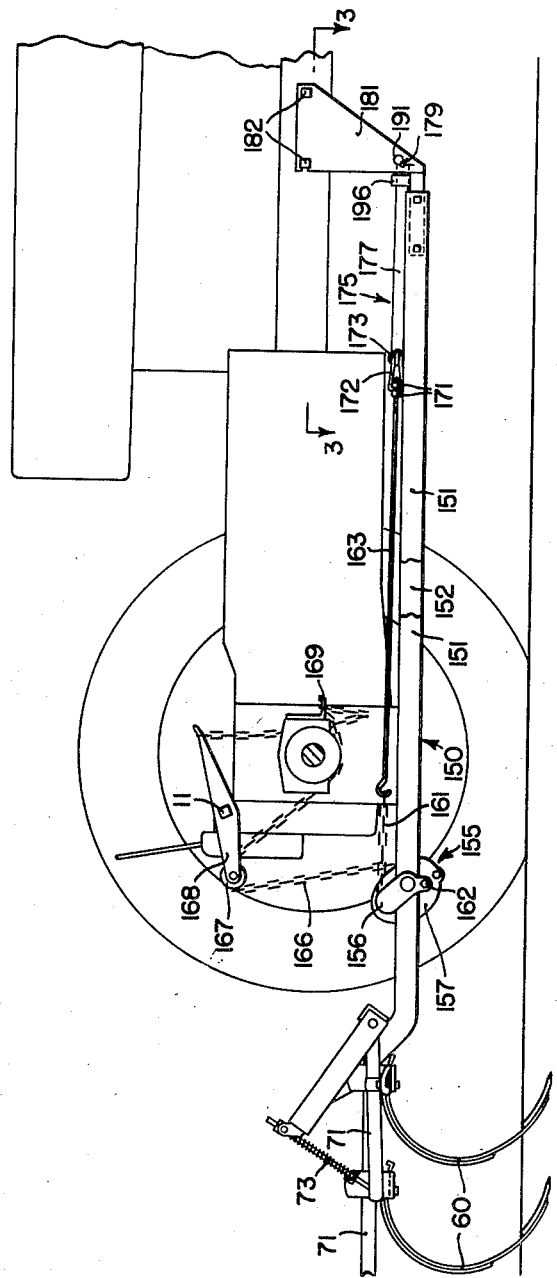

2,688,282

UNITED STATES PATENT OFFICE 2,688,282

TRACTOR DRAWN PLOW

John H. Starr, Mayville, Wis., assignor to John Deere Van Brunt Company, Horicon, Wis., a corporation of Wisconsin Application October 25, 1948, Serial No. 56,376

12 Claims. (Cl. 97—46.93)

1

This application is a continuation-in-part of my co-pending application, Serial No. 713,340, filed November 30, 1946, now Patent No. 2,626,551.

The present invention relates generally to agricultural implements and more particularly to implements that are adapted to be mounted on a tractor to be propelled thereby.

The object and general nature of the present invention is the provision of an integral or tractor mounted implement having a draft transmitting connection with the tractor which provides for a limited amount of generally fore and aft movement of the implement relative to the tractor, and new and improved hitch means acting between the forward portion of the implement and the tractor to accommodate the aforesaid relative movement but preventing or limiting generally vertical movement of the front portion of the implement relative to the tractor. Additionally, it is an important feature of this invention to provide new and improved hitch means and draft means interconnecting the implement with the tractor whereby the draft-transmitting means is connected with the implement rearwardly of the front end thereof and is so constructed and arranged as to accommodate relative fore and aft movement between the implement and the tractor, in connection with the hitch means connecting the front end of the implement with the tractor and cooperating with the draft means so as to prevent vertical movement of the front end of the implement relative to the tractor while accommodating the aforesaid relative movement. Still further, another feature of this invention is the provision of new and improved hitch means which not only accommodates the fore and aft movement of the implement relative to the tractor, but also is so constructed and arranged to facilitate the attachment of the implement to the tractor whereby the connection and disconnection of the implement may easily and quickly be accomplished.

These and other objects and advantages of the present invention will be apparent to those skilled in the art after a consideration of the following detailed description, taken in conjunction with the accompanying drawings.

In the drawings:

Figure 1 is a side view of the rear portion of a tractor mounted field cultivator in which the principles of the present invention have been incorporated.

Figure 2 is another form of the present invention in which the front end of the implement frame is supported for sliding movement on the

2 forward part of the draft connection extending between a generally intermediate portion of the implement and the tractor.

Figure 3 is a partial plan view, showing the forward portion of the implement and corresponding generally to a section taken along the line 3—3 of Figure 2.

Figure 4 is a detail sectional view, taken generally along the line 4—4 of Figure 3.

Referring now first to Figure 1, in which one form of the present invention has been illustrated, the tractor on which the implement is mounted is largely conventional, so far as the present invention is concerned, and is indicated in its entirety by the reference numeral 1. The tractor 1 incorporates a frame 2 supported on a pair of closely spaced front wheels (not shown) and relatively widely spaced rear traction wheels 4 fixed to the outer ends of laterally outwardly extending axles 5. The tractor 1 includes a motor 7 from which power is derived for operating a power lift, indicated in its entirety by the reference numeral 10. The power lift 10 preferably includes a transverse power lift rockshaft 11, the power lift being controlled by any suitable means, such as a valve unit including a valve-operating lever 13. A pair of power lift arms 14 are fixed by any suitable means to the laterally outer ends of the power lift rockshaft 11.

The implement in which the principles of the present invention have been incorporated as disclosed in Figure 1 is a spring tooth field cultivator indicated in its entirety by the reference numeral 20. The cultivator 20 incorporates a frame 21 which is made up of right and left hand generally longitudinally extending frame bars 22 and 23 to the rear upwardly extending portions of which are secured front and rear transversely extending frame angles 24 and 25 which may be welded or bolted, as desired, to the rear upwardly angled portions of the longitudinal frame bars 22 and 23. A pair of strap members 28 are bolted or otherwise secured to the front ends of the longitudinal frame angles 22 and 23, and the forward ends of the strap members 28 are apertured to receive pivot members 31. The pivot members are carried by a swinging link hitch structure indicated in its entirety by the reference numeral 35. The structure 35 comprises right and left hand angled strap members 36, the lower end portions of which diverge outwardly and downwardly. The strap members are apertured to receive the pivot members 31. The swinging hitch structure 35 is pivotally connected to the tractor frame 2 by means of pivot pins 44.

The implement 20 includes three rows of spring teeth 60 which are mounted on drag bars 71. Spring pressure rods 73 normally urge the drag bars downwardly. The forward ends of the frame bars 22 and 23 are connected together by suitable cross braces (not shown). The swinging link hitch structure 35 permits the implement frame 21 to shift generally fore and aft, but the front end of the implement is held against any substantial amount of generally vertical movement.

A pair of draft transmitting, generally fore and aft extending links 131 are adjustably connected, as at 132, to the lower ends of draft brackets 133 that are fixed to the sides of the tractor frame in any suitable way. The rear end of each of the draft links 131 is connected by a chain section 136 to an associated cam member 137 which is mounted for rocking movement on the associated tool frame member. Each cam member 137 includes an outer cam section 139 and an inner cam section 141 rigidly fastened together, as by a shaft section 142 or the like. The rear end of the draft chain 136 is fastened by a pin 143 or the like to a lug 144 that forms a part of the cam section 141. A lifting chain 146 extends upwardly from each of the outer cam sections 139 and passes over a pulley 147 carried at the outer end of the associated power lift arm 14. The forward end of the lifting chain 146 extends forwardly of the associated power lift arm 14 and connected to the tractor by a hook member 148 or other suitable means.

In this form of the invention, the draft pull is balanced against the weight of the rear end of the implement and the suction of the tools, variation in any of these factors causing the cam members 137 to rock to bring the forces into equilibrium. Such rocking movement causes a fore and aft shifting of the implement relative to the tractor, which is accommodated by the swinging of the links 36, but the links 36 hold the front end of the implement against vertical movement.

A further modified form of the present invention is shown in Figures 2 et seq. In this form of the invention the implement frame is indicated in its entirety by the reference numeral 150 and comprises right and left hand frame bars 151 and 152, the rear ends of which are bent upwardly and rearwardly to receive cultivator tools and associated frame members, which may be of substantially the same construction as shown in Figure 1. The rear portion of each frame bar carries a rockably mounted cam member 155, which may be substantially the same as the cam members 137 described above. Briefly, each cam member includes an outer section 156 and an inner section 157 rigidly interconnected by any suitable means. Each of the outer cam sections 156 carries a draft chain 161, which is fixed to the associated cam section by a pin 162 or the like. The forward end of the chain 161 is connected to a draft link 163 which at its forward end is connected to the tractor as will be described below. The other cam section 157 of each cam member 155 receives and has fixed thereto the lower end of a lifting chain 166, the upper end of which is trained over a pulley or sheave 167 fixed to a lifting arm 168 that is carried by the power lift rockshaft 11. The forward end of each chain 166 extends forwardly from the sheave or pulley 167, underneath the rear axle housing and is connected to an anchoring hook member 169.

The forward end of each of the draft links 163 is screw threaded and carries a pair of lock nuts 171 which fasten a clevis 172 thereto. The forward end of each of the clevises 172 is connected by a pin 173 to a transverse bar 174 which forms a part of a generally U-shaped horizontally disposed generally fore-and-aft extending draft memer 175. The forwardly extending portions or side arms are formed by bars 176 and 177 which are pivotally connected, as by pins 179, to right and left hand draft brackets 181 bolted, as at 182, to the sides of the tractor. Preferably, the lower end of each of the draft brackets 181 is provided with a vertically disposed bracket or lug 185, the upper and lower portions 186 and 187 of which are welded to the side of the associated draft bracket and the central section of which is apertured, as at 188, in line with an aperture 189 formed in the draft bracket, the apertures 188 and 189 receiving the associated pivot pin 179, which is held in place by a quick detachable fastener 191. The chains 161 and links 163 constitute a draft connection or draft-transmitting means extending between the rear end of the draft member 175 and the implement frame 150.

The forward end of the implement frame 150 is supported in normal operation on the side members 176 and 177 of the U-shaped draft member 175, and to this end the forward ends of the frame angles 151 and 152 are interconnected by a transversely disposed U-shaped angle 195 on which a pair of U-shaped members in the form of slides 196 are fixed, as by welding. As best shown in Figure 2, the slides 196 form fore-and-aft shiftable parts that receive the side bars 176 and 177 so as to accommodate fore and aft shifting of the implement relative to the tractor. By virtue of the transverse member 195 being engageable with the rear edges of the brackets 181, the frame 150 is prevented from shifting too far forwardly relative to the tractor.

It will be understood that in this form of the invention the draft transmitted through the links 161, 163 and associated parts normally holds the member 175 in a horizontal position while accommodating the shifting of the implement in a fore and aft direction as the cam members 155 rock in one direction or the other to maintain the draft and lifting forces in equilibrium. The bar 174 overlies the frame angles 151 and 152, and therefore when the draft forces transmitted by the links 161, 163 slacken off, the weight of the front end of the implement is still supported by the slides 196 on the side arms 176 and 177 of the member 175, yet the latter, being pivotally connected to the brackets 181, accommodate any vertical movement of the rear end of the implement and also its fore and aft shifting, as mentioned above.

The implement shown in Figures 2 et seq. is especially adapted for quick attachment to and disconnection from the tractor. To disconnect the implement, all that the operator has to do is to unhook the chains 166 from the hooks 169 and remove the fasteners 191 and take out the pins 179. The tractor may then be driven away from the implement. In reconnecting the implement to the tractor, the operator raises the front end of the implement into such position that the front ends of the side bars 176 and 177 may be shifted into the lugs 185. This provides a support for the front end of the implement even though the pins 179 are not in place. It is therefore a relatively simple matter to connect the front end of the implement to the brackets 181 since all that the operator has to do is to shift the bars 176 and 177 in the lugs 185 until the opening 198 in each bar 177 comes into registry with the openings 188 and 189, whereupon the pins 179 may be inserted. It is not necessary for the operator to manually hold up the front end of the implement at the same time he brings the openings 198 in the front end members into alignment with the bracket openings to insert the hitch pin.

While I have shown and described above the preferred structure in which the principles of the present invention have been incorporated, it is to be understood that my invention is not to be limited to the particular details, shown and described above, but that, in effect, widely different means may be employed in the practice of the broader aspects of my invention.

What I claim, therefore, and desire to secure by Letters Patent is:

1. In an agricultural implement of the type adapted to be connected with a propelling tractor, hitch means for connecting the implement to the tractor, comprising a pair of draft brackets attached to the forward portion of the tractor, draft means connected between said draft brackets and the implement rearwardly of the front end thereof and including relatively movable parts, accommodating a limited amount of generally fore and aft movement of the implement relative to the tractor, and a pair of generally fore-and-aft extending members connected at their forward ends with said brackets, and means providing a sliding connection between the front portion of the implement and said members accommodating said relative movement but limiting the generally vertical movement of the front portion of the implement relative to the tractor.

2. In an agricultural implement adapted to be connected with a tractor to be propelled thereby, implement frame means disposed generally along the tractor and extending in a fore and aft direction, a bar disposed in a fore and aft extending position alongside the front portion of said frame means and having its front end pivoted to a forward portion of the tractor, means slidably connecting the front end of said frame means with said bar, draft transmitting means extending along said implement frame means and connected at its forward end with the rear portion of said bar, means for connecting the rear end of said draft-transmitting means with the rear portion of the tractor, and means on the rear portion of said frame means receiving said draft-transmitting means and transmitting the reaction thereof to the rear portion of said frame means.

3. In an agricultural implement adapted to be connected with a tractor to be propelled thereby, implement frame means disposed generally along the tractor and extending in a fore and aft direction, said frame means including laterally spaced apart frame members and a cross member connected to the forward end portions of said frame members, a forward draft-transmitting member including side portions extending forwardly alongside the front portions of said frame members and adapted to be connected at their front ends with a tractor, means on the cross member slidably receiving said side portions, a rear draft-transmitting means extending along said frame members for connecting the rear portion of said forward draft-transmitting member with the tractor, and means on the rear portion of said frame means for movably supporting the rear end thereof on said draft-transmitting means.

4. Means for connecting the frame means of an implement to a tractor, comprising a pair of depending brackets attachable to the sides of the tractor in depending relation, a generally horizontally disposed U-shaped member having forward ends pivoted to the lower ends of said brackets, slides mounted on the forward portion of said frame means and engaging and supported on the arm portions of said U-shaped member, the rear portion of the latter overlying the adjacent portions of said frame means, and draft transmitting means connecting the implement frame means with the rear end of said U-shaped member for limited movement relative thereto in a fore and aft direction.

5. Means for connecting the frame means of an implement to a tractor, comprising a pair of depending brackets attachable to the sides of the tractor in depending relation, a generally horizontally disposed U-shaped member having forward ends pivoted to the lower ends of said brackets, slides mounted on the forward portion of said frame means and engaging and supported on the arm portions of said U-shaped member, the rear portion of the latter overlying the adjacent portions of said frame means, a pair of generally fore-and-aft extending links connected at their forward ends to the rear portion of said U-shaped member, and means connecting the rear ends of said links with said implement frame means and providing for limited movement of the latter relative to the tractor.

6. Connecting means as set forth in claim 5, further characterized by lugs carried by said brackets for supporting the forward ends of said U-shaped member to facilitate pivotally connecting said ends to said brackets.

7. Means for connecting the frame means of an implement to a tractor, comprising a pair of depending brackets attachable to the sides of the tractor in depending relation, a generally horizontally disposed U-shaped member having forwardly extending apertured ends, lug means at the lower ends of said brackets, each of said lug means including a portion underlying the associated end of the U-shaped member and a portion lying alongside said end, the latter portion being apertured, said lug means being thereby adapted to receive and support the forward ends of said U-shaped member, detachable pivots insertable through the apertures in said lug means and the forward ends of said U-shaped member when the latter is supported on said lug means and said apertures are in registry, and means shiftably connecting said U-shaped member with the implement frame means.

8. An agricultural implement adapted to be connected to a tractor to be propelled thereby, comprising a generally fore-and-aft extending tool frame including a pair of laterally spaced frame bars and a crossbar connecting the forward ends of said frame bars, means for connecting said tool frame with the tractor for generally fore-and-aft shifting movement including a pair of brackets attachable to the sides of the tractor, the crossbar of said frame being engageable with the rear edges of said attaching brackets for limiting the forward movement of said frame relative to the tractor, and draft means connecting said tool frame and the tractor and accommodating said fore-and-aft movement of the tool frame relative to the tractor.

9. Means for connecting the frame means of an implement to a tractor, said frame means having a forward portion, comprising a pair of depending brackets attachable to the sides of the tractor in depending relation, a generally horizontally disposed part having a rear portion and forward ends pivoted to the lower ends of said brackets, slides mounted on the forward portion of said frame means and engaging and supported on said part, the rear portion of the latter overlying the adjacent portions of said frame means, and draft-transmitting means connecting the implement frame means with the rear portion of said part for limited movement relative thereto in a fore-and-aft direction.

10. The invention set forth in claim 9, further characterized by means on the forward portion of said implement frame means and engageable with said brackets for limiting the forward movement of said frame means relative to said brackets.

11. The invention set forth in claim 9, further characterized by a crossbar connected with the frame means and carrying said slides, said crossbar being engageable with said brackets for limiting the forward movement of said frame means relative to said brackets.

12. In an agricultural implement of the type adapted to be connected with a propelling tractor, hitch means for connecting the implement to the tractor, comprising a draft bracket attachable to the tractor, means swingably connecting the front end of the implement with the draft bracket for generally vertical movement, said connecting means including relatively movable parts accommodating a limited amount of generally fore-and-aft movement of the implement relative to the tractor, but limiting the generally vertical movement of the front end of the implement relative to the tractor, and a draft transmitting connection extending from the rear portion of the implement forwardly to said draft bracket and pivotally connected with the latter so as to swing with the implement about a transverse axis relative to said bracket.

References Cited in the file of this patent

UNITED STATES PATENTS

| Number | Name | Date |
| --- | --- | --- |
| 2,368,631 | Blalock | Feb. 6, 1945 |
| 2,462,641 | Hyland | Feb. 22, 1949 |
| 2,586,919 | Court | Feb. 26, 1952 |